United States Patent
Chiu et al.

(10) Patent No.: US 10,298,907 B2
(45) Date of Patent: May 21, 2019

(54) METHOD AND SYSTEM FOR RENDERING DOCUMENTS WITH DEPTH CAMERA FOR TELEPRESENCE

(71) Applicant: FUJI XEROX CO., LTD., Tokyo (JP)

(72) Inventors: Patrick Chiu, Mountain View, CA (US); Sven Kratz, San Jose, CA (US); Shingu Jun, Tokyo (JP); Laurent Denoue, Verona (IT)

(73) Assignee: FUJI XEROX CO., LTD., Tokyo (JP)

( * ) Notice: Subject to any disclaimer, the term of this patent is extended or adjusted under 35 U.S.C. 154(b) by 52 days.

(21) Appl. No.: 15/133,608

(22) Filed: Apr. 20, 2016

(65) Prior Publication Data

US 2017/0310920 A1    Oct. 26, 2017

(51) Int. Cl.
| | |
|---|---|
| *H04N 5/445* | (2011.01) |
| *H04N 13/204* | (2018.01) |
| *G06F 3/03* | (2006.01) |
| *G06F 3/041* | (2006.01) |
| *G06F 3/042* | (2006.01) |
| *G06F 3/0484* | (2013.01) |
| *G06K 9/00* | (2006.01) |
| *H04N 13/271* | (2018.01) |

(52) U.S. Cl.
CPC ......... *H04N 13/204* (2018.05); *G06F 3/0304* (2013.01); *G06F 3/0418* (2013.01); *G06F 3/0425* (2013.01); *G06F 3/0426* (2013.01); *G06F 3/04842* (2013.01); *G06K 9/00382* (2013.01); *G06K 9/00389* (2013.01); *G06K 9/00442* (2013.01); *H04N 13/271* (2018.05)

(58) Field of Classification Search
CPC .......... H04N 7/15; H04N 7/152; H04N 7/155; H04N 13/204
USPC ...... 348/598, 584, 14.08, 14.09, 14.05, 552, 348/563, 564; 725/133, 141, 153
See application file for complete search history.

(56) References Cited

U.S. PATENT DOCUMENTS

| | | | |
|---|---|---|---|
| 8,230,367 B2 | 7/2012 | Bell et al. | |
| 8,860,773 B2 * | 10/2014 | Clapis | H04N 7/15 348/14.03 |
| 2011/0052062 A1 * | 3/2011 | Chiu | G06K 9/00456 382/176 |

FOREIGN PATENT DOCUMENTS

JP    2010-539590    12/2010

OTHER PUBLICATIONS

Cowan, L. G., et al., ShadowPuppets: Supporting Collocated Interaction with Mobile Projector Phones Using Hand Shadows, CHI 2011, May 7-12, 2011, Vancouver BC Canada, pp. 2707-2716 (10 pgs).

(Continued)

*Primary Examiner* — Paulos M Natnael
*Assistant Examiner* — Jean W Desir
(74) *Attorney, Agent, or Firm* — Procopio, Cory, Hargreaves & Savitch LLP

(57) ABSTRACT

A method of sharing documents is provided. The method includes capturing first image data associated with a document, detecting content of the document based on the captured first image data, capturing second image data associated with an object controlled by a user moved relative to the document, determining a relative position between the document and the object, combining a portion of the second image data with the first image data based on the determined relative position to generate a combined image signal that is displayed, and emphasizing a portion of the content in the displayed combined image signal, based on the relative position.

20 Claims, 12 Drawing Sheets

(56) References Cited

OTHER PUBLICATIONS

Genest, A., et al., KinectArms: A Toolkit for Capturing and Displaying Arm Embodiments in Distributed Tabletop Groupware, CSCW '13, Feb. 23-27, 2013, San Antonio Texas, pp. 157-166 (10 pgs).

Izadi, S., et al., C-Slate: A Multi-Touch and Object Recognition System for Remote Collaboration Using Horizontal Surfaces, Proceedings of the Second Annual IEEE International Workshop on Horizontal Interactive Human-Computer Systems (Tabletop 2007), 2007, 8 pgs.

Kim, C., et al., High-Quality Capture of Documents on a Cluttered Tabletop with a 4K Video Camera, DocEng '15, Sep. 8-11, 2015, Lausanne Switzerland, pp. 219-222 (4 pgs).

Kolsch, M. et al., Vision-Based Interfaces for Mobility, Proceedings for the First Annual International Conference of Mobile and Ubiquitous Systems: Networking and Services (MobiQuitous '04), 2004, 9 pgs.

Rekimoto, J., BrightShadow: Shadw Sensing with Synchronous Illuminations for Robust Gesture Recognition, CHI 2008 Proceedings, Apr. 5-10, 2008, Florence Italy, pp. 2769-2774 (6 pgs).

Shi, J., et al., Good Features to Track, IEEE Conference on Computer Vision and Pattern Recognition (CVPR94), Jun. 1994, Seattle, 8 pgs.

Shoemaker, G., et al., Shadow Reaching: A New Perspective on Interaction for Large Wall Displays, UIST'07, Oct. 7-10, 2007, Newport Rhode Island, pp. 53-56 (4 pgs).

Shoemaker, G., et al., Body-Centric Interaction Techniques for Very Large Wall Displays, NordiCHI 2010, Oct. 16-20, 2010, Reykjavik Iceland, 10 pgs.

Tan, D. S., et al. Pre-Emptive Shadows: Eliminating the Blinding Light from Projectors, CHI 2002, Apr. 20-25, 2002, Minneapolis Minnesota, pp. 682-683 (2 pgs).

Zivkovic, Z., Improved Adaptive Gaussian Mixture Model for Background Subtraction, Pattern Recognition, 2004, In Proc.ICPR, 4 pgs.

Intel RealSense F200 camera, URL: https://software.intel.com/en-us/realsense/f200camera, retrieved on Apr. 18, 2016 using the wayback machine, 3 pgs.

* cited by examiner

METHOD AND SYSTEM FOR RENDERING DOCUMENTS WITH DEPTH CAMERA FOR TELEPRESENCE

BACKGROUND

Field

The present disclosure relates to telepresence and teleconference systems, and more specifically, to sharing documents during remote synchronous meetings.

Related Art

During remote synchronous meetings, (e.g., telepresence or teleconference meetings with remotely located users) remote users may discuss a document or a slide, but the discussion may be difficult to follow. For example, in a related art system for remote synchronous meetings, the system may show a live feed of images of the document, separate from video images of the remote users' faces and/or bodies. In such related art systems, when a speaker is talking about or referring to different parts of the document, a listener may find it difficult to determine which parts of the document are being discussed.

Some related art systems may provide a telepointer (e.g., a remote graphical cursor controlled by a mouse or other control device) to be used by the presenter. However, if the telepointer is too small, the telepointer can be difficult for a listener to see during the teleconference. On the other hand, if the telepointer cursor is too large, the telepointer may occlude or hide too much of the document content. Furthermore, a graphical cursor is not very expressive, and the interaction with the telepointer is not as intuitive for the presenter because the mouse or other control device must be used.

Other related art systems allow the presenter to point at parts of the document with a finger or other object, and use a video signal to display the hand or object to remote user's site. However, there is still a tradeoff between seeing the hand or object and occluding the content.

SUMMARY

Aspects of the present application may include a method of sharing documents. The method may include capturing first image data associated with a document, detecting content of the document based on the captured first image data, capturing second image data associated with an object controlled by a user moved relative to the document, determining a relative position between the document and the object, combining a portion of the second image data with the first image data based on the determined relative position to generate a combined image signal that is displayed, and emphasizing a portion of the content in the displayed combined image signal, based on the relative position.

Further aspects of the present application may include a non-transitory computer readable medium having stored therein a program for making a computer execute a method of sharing documents. The method may include capturing first image data associated with a document, detecting content of the document based on the captured first image data, capturing second image data associated with an object controlled by a user moved relative to the document, determining a relative position between the document and the object, combining a portion of the second image data with the first image data based on the determined relative position to generate a combined image signal that is displayed, and emphasizing a portion of the content in the displayed combined image signal, based on the relative position.

Additional aspects of the present application may include a document sharing apparatus configured to share a document. The apparatus may include a memory, an image capture device and a processor. The processor may be configured to capture first image data associated with a document, detect content of the document based on the captured first image data, capture second image data associated with an object controlled by a user moved relative to the document, determine a relative position between the document and the object, combine a portion of the second image data with the first image data based on the determined relative position to generate a combined image signal that is displayed, and emphasize a portion of the content in the displayed combined image signal, based on the relative position.

Still further aspects of the present application may include a document sharing apparatus configured to share a document. The apparatus may include means for capturing first image data associated with a document, detecting content of the document based on the captured first image data, means for capturing second image data associated with an object controlled by a user moved relative to the document, means for determining a relative position between the document and the object, means for combining a portion of the second image data with the first image data based on the determined relative position to generate a combined image signal that is displayed, and means for emphasizing a portion of the content in the displayed combined image signal, based on the relative position.

BRIEF DESCRIPTION OF THE DRAWINGS

Exemplary embodiment(s) of the present invention will be described in detail based on the following figures, wherein.

DETAILED DESCRIPTION

Figure 1:
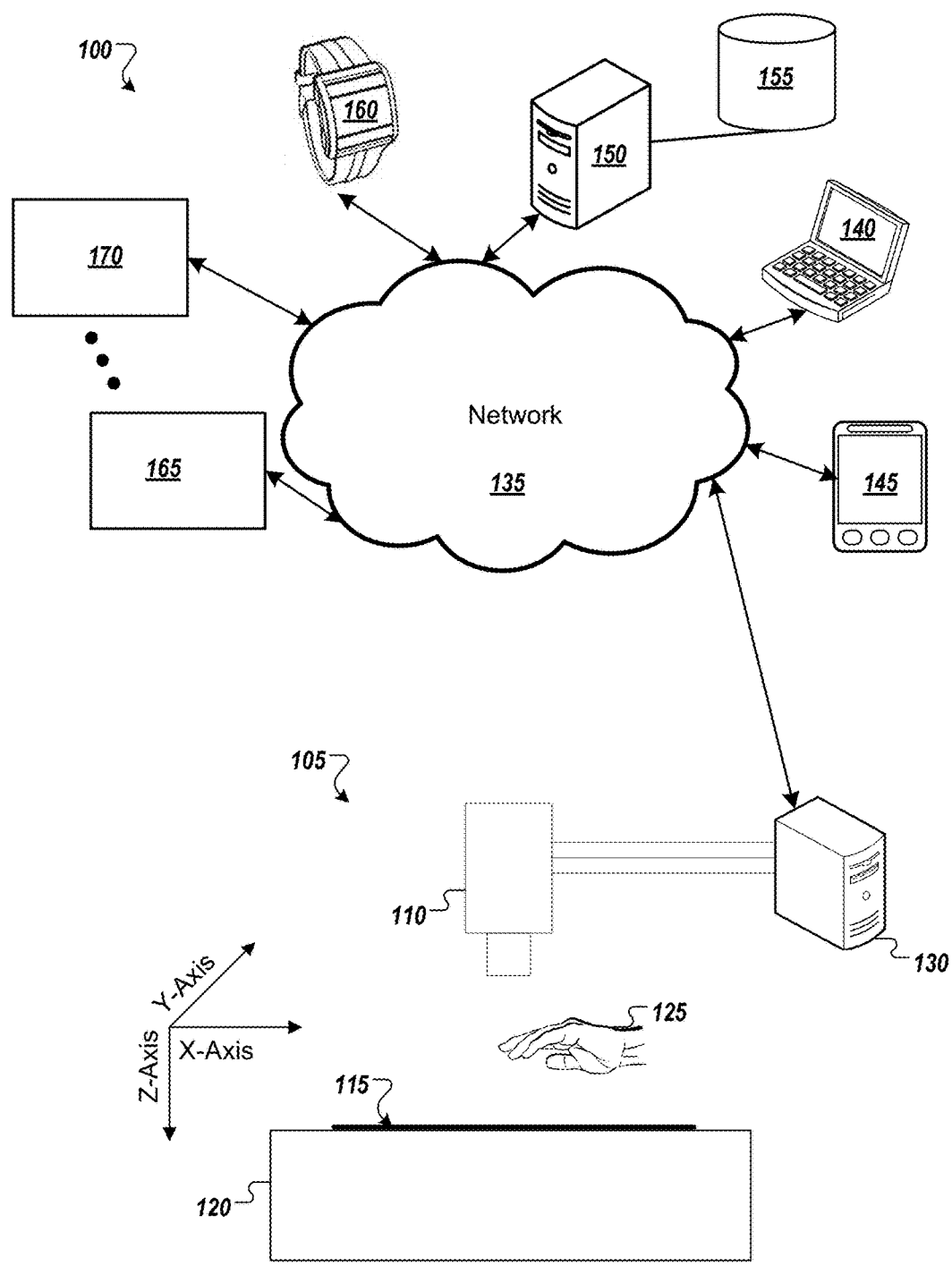
FIG. 1 illustrates a device for sharing a document within a remote synchronous meeting system according to a first example implementation of the present application.

The following detailed description provides further details of the figures and example implementations of the present application. Reference numerals and descriptions of redundant elements between figures may be omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

In example implementations of the present application, an object controlled by a speaker (e.g., a hand, a pen, a pointer stick, or any other object that may be used to point) hovering over a document may be rendered so that the object is partially translucent, with the level of translucency depending on proximity to the document. An effect of this option may be that the object controlled by the speaker close to the document may be rendered less translucent to pinpoint areas of the document being discussed to assist following a discussion. Additionally, parts of the object farther from the document may be rendered more transparent to reduce occlusion of the document. As discussed in greater detail below, Further, in some example implementations, the position of the object may be modeled in 3D space, and emphasis of semantically meaningful portions (e.g., words, text lines, paragraphs, illustrations) of the document may be provided on the document based on the relative position between the object and the document.

FIG. 1 illustrates an apparatus 105 for sharing a document within a remote synchronous meeting system 100 according to a first example implementation of the present application. The apparatus 105 includes an image capture device 110 located spaced apart from a document support surface 120 along a Z-Axis. In some example implementations, the image capture device 110 may be a depth camera that has multiple channels capturing color image data and depth image data. Examples of usable depth cameras may include the INTEL REALSENSE F200 camera and the MICROSOFT KINECT device. Other examples of depth cameras may be apparent to a person of ordinary skill in the art. Further as discussed below with respect to FIG. 2, some example implementations of the present application may use other techniques of determining depth information without using a depth camera. In such example implementations, the image capture device may be digital camera, a video camera, a web-camera, or any other image capture device that may be apparent to a person of ordinary skill in the art.

The image capture device 110 may be configured to capture image data of a document 115 placed on the document support surface 120. In some example implementation, the document 115 may be a printed document printed on paper or any other printable material. In other example implementations, the document 115 may be an electronic document displayed on a tablet or other computing device. The image capture device may also be configured to detect the content or portions of content of the document using object recognition, text recognition, pattern recognition, or other image recognition techniques in some example implementations.

The image capture device 110 may also be configured to capture image data or an image signal representative of an object 125 (e.g., a hand, a pen, a pointer stick, or any other object that may be used to point at the document 115) when the object 125 is located between the image capture device 110 and the document support surface 120. The document support surface 120 is not particularly limited and may include a tabletop, a countertop, desktop, floor, shelf, or any other surface that a document or document display device may be placed on.

The image capture device 110 may further be configured to detect the relative position between the object 125 and the document 115. For example, the image capture device 110 may use object tracking techniques to detect and/or calculate the relative position within the field of view (e.g., along the X-Axis and Y-Axis) of the camera. Further, in example implementations with a depth camera is used as the image capture device 110, the image capture device 110 may also track the relative position of the object 125 along the Z-axis.

The apparatus 105 for sharing the document may also include a computing device 130 coupled to the image capture device 110 to process captured image data of the document 115, the captured image information of the object 125 and the detected or calculated relative position of the object 125. For example, the computing device 130 may perform the object recognition, text recognition, pattern recognition, or other image recognition techniques to detect the content of the document 115. The computing device 130 may also perform object tracking techniques to detect and/or calculate the relative position. In some example implementations, the computing device 130 may be a computing device (e.g., computing device 1005 of the computing environment 1000 of FIG. 10 discussed below).

The computing device 130 may also generate a combined image signal based on the captured image data of the document 115, the captured image information of the object 125 and the detected or calculated relative position of the object 125 in some example implementations as discussed in greater detail below. In some example implementations, the computing device 130 may also transmit the combined image signal to a plurality of devices 140-170, communicatively connected to one another via, for example, a network 135 (e.g., by wireline and/or wireless connections).

The plurality of devices 140-170 may include, but are not limited to, a computer 140 (e.g., a laptop computing device), mobile devices 145 (e.g., smartphone or tablet), a wearable device 160 (e.g., a smart watch), a server computer 150 connected to a storage device 155 and other computing devices 165-170 that may be apparent to a person of ordinary skill in the art. The devices 140-170 may also have a computing environment 1000 as shown below in FIG. 10.

Though in some example implementations the computing device 130 may generate a combined image signal before transmitting the combined image signal to the plurality of devices 140-170, example implementations of the present application are not limited to this configuration. For example, the computing device 130 may combine the captured image data of the document 115, the captured image data of the object 125, and data representative of the detected or calculated relative position of the object 125 to generate the combined image signal using processes or algorithms discussed below.

Conversely, in other example implementations, the computing device 130 may transmit the captured image data of the document 115, the captured image data of the object 125 and the data representative detected or calculated relative position of the object 125 as separate signals to one or more of the plurality of devices 140-170. Once the separate signals are received, each of the plurality of devices 140-170 may combine the separate signals using processes or algorithms discussed below to generate the combined image signal.

The computing device 130 may determine whether to transmit the combined image signal or separate signals corresponding to the captured image data of the document 115, the captured image data of the object 125, and data representative of the detected or calculated relative position of the object 125 during an initial setup of a remote synchronous meeting. The determination of whether to transmit the combined image signal or the separate signals may be based on the querying each of the plurality of devices 140-170 to determine capabilities of each of the plurality of devices 140-170 and the bandwidth available for data transfer to each of the plurality of devices 140-170.

Figure 2:
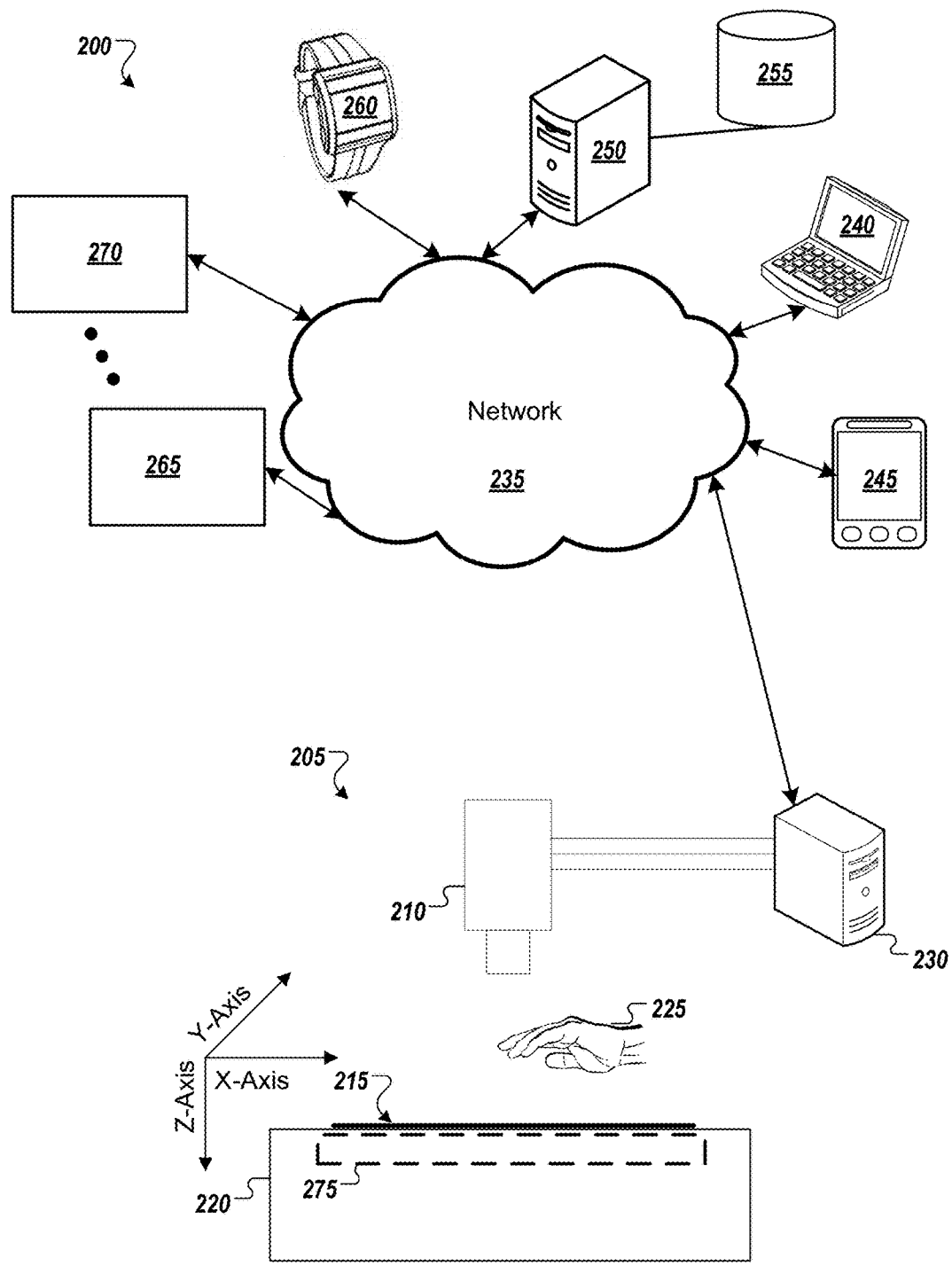
FIG. 2 illustrates a device for sharing a document within a remote synchronous meeting system according to a second example implementation of the present application.

FIG. 2 illustrates another apparatus 205 for sharing a document within a remote synchronous meeting system 200. The apparatus 205 is similar to the apparatus 105 discussed above, with additional components and functionality discussed below. The apparatus 205 includes an image capture device 210 located spaced apart from a document support surface 220 along a Z-Axis. In some example implementations, the image capture device 210 may be a depth camera that has multiple channels capturing with color image data and depth image data. In other example implementations, the image capture device 210 may be a web camera or other camera that is not configured to capture depth images.

The image capture device 210 may be configured to capture image data of a document 215 placed on the document support surface 220. In some example implementations, the document 215 may be a printed document printed on paper or any other printable material. In other example implementations, the document 215 may be an electronic document displayed on a tablet or other computing device. In some example implementations, the image capture device may be configured to detect the content or portions of content of the document using object recognition, text recognition, pattern recognition, or other image recognition techniques.

The image capture device 210 may also be configured to capture image data or an image signal representative of an object 225 (e.g., a hand, a pen, a pointer stick, or any other object that may be used to point at the document 215) when the object 225 is located between the image capture device 210 and the document support surface 220. The document support surface 220 is not particularly limited and may include a tabletop, a countertop, desktop, floor, shelf, or any other surface that a document or document display device may be placed on.

The image capture device 210 may also be configured to detect the relative position between the object 225 and the document 215. For example, image capture device 110 may use object tracking techniques to detect and/or calculate the relative position within the field of view (e.g., along the X-Axis and Y-Axis) of the camera. In example implementations with a depth camera used as the image capture device 210, the image capture device 210 may also track the relative position of the object 225 along the Z-axis.

The apparatus 205 may also include a sensor unit 275 for detecting a distance between the object 225 and one or more of the image capture device 210 and/or the document support surface 220. The sensor unit 275 may be a capacitive sensor or any other sensor capable of detecting the distance between the object 225 and the image capture device 210 or the document support surface 220. The sensor unit 275 may be used to track the relative position of the object 225 along the Z-axis.

The apparatus 205 for sharing the document may also include a computing device 230 coupled to the image capture device 210 to process captured image data of the document 215, the captured image information of the object 225 and the detected or calculated relative position of the object 225. For example, the computing device 130 may perform the object recognition, text recognition, pattern recognition, or other image recognition techniques to detect the content of the document 215. The computing device 230 may also perform object tracking techniques to detect and/or calculate the relative position. In some example implementations, the computing device 230 may be a computing device (e.g., 1005 of the computing environment 1000 of FIG. 10 discussed below).

The computing device 230 may also generate a combined image signal based on the captured image data of the document 215, the captured image information of the object 225 and the detected or calculated relative position of the object 225 in some example implementations as discussed in greater detail below. The computing device 230 may also transmit the combined image signal to a plurality of devices 240-270, communicatively connected to one another via, for example, a network 235 (e.g., by wireline and/or wireless connections) in some example implementations.

The plurality of devices 240-270 may include, but are not limited to, a computer 240 (e.g., a laptop computing device), mobile devices 245 (e.g., smartphone or tablet), a wearable device 260 (e.g., a smart watch), a server computer 250 connected to a storage device 255 and other computing devices 265-270 that may be apparent to a person of ordinary skill in the art. The devices 240-270 may also have a computing environment as shown below in FIG. 10.

Though in some example implementations the computing device 230 may generate a combined image signal before transmitting the combined image signal to the plurality of devices 240-270, example implementations of the present application are not limited to this configuration. For example, the computing device 230 may combine the captured image data of the document 215, the captured image data of the object 225, and data representative of the detected or calculated relative position of the object 225 to generate the combined image signal using processes or algorithms discussed below.

Conversely, in other example implementations, the computing device 230 may transmitted the captured image data of the document 215, the captured image information of the object 225 and the detected or calculated relative position of the object 225 as separate signals to one or more of the plurality of devices 140-170. Once the separate signals are received, each of the plurality of devices 240-270 may combine the separate signals using processes or algorithms discussed below to generate the combined image signal.

The computing device 230 may determine whether to transmit the combined image signal or separate signals corresponding to the captured image data of the document 215, the captured image data of the object 225, and data representative of the detected or calculated relative position of the object 225 during an initial setup of a remote synchronous meeting. The determination of whether to transmit the combined image signal or the separate signals may be based on the querying each of the plurality of devices 240-270 to determine capabilities of each of the plurality of devices 240-270 and the bandwidth available for data transfer to each of the plurality of devices 240-270.

Figure 3:
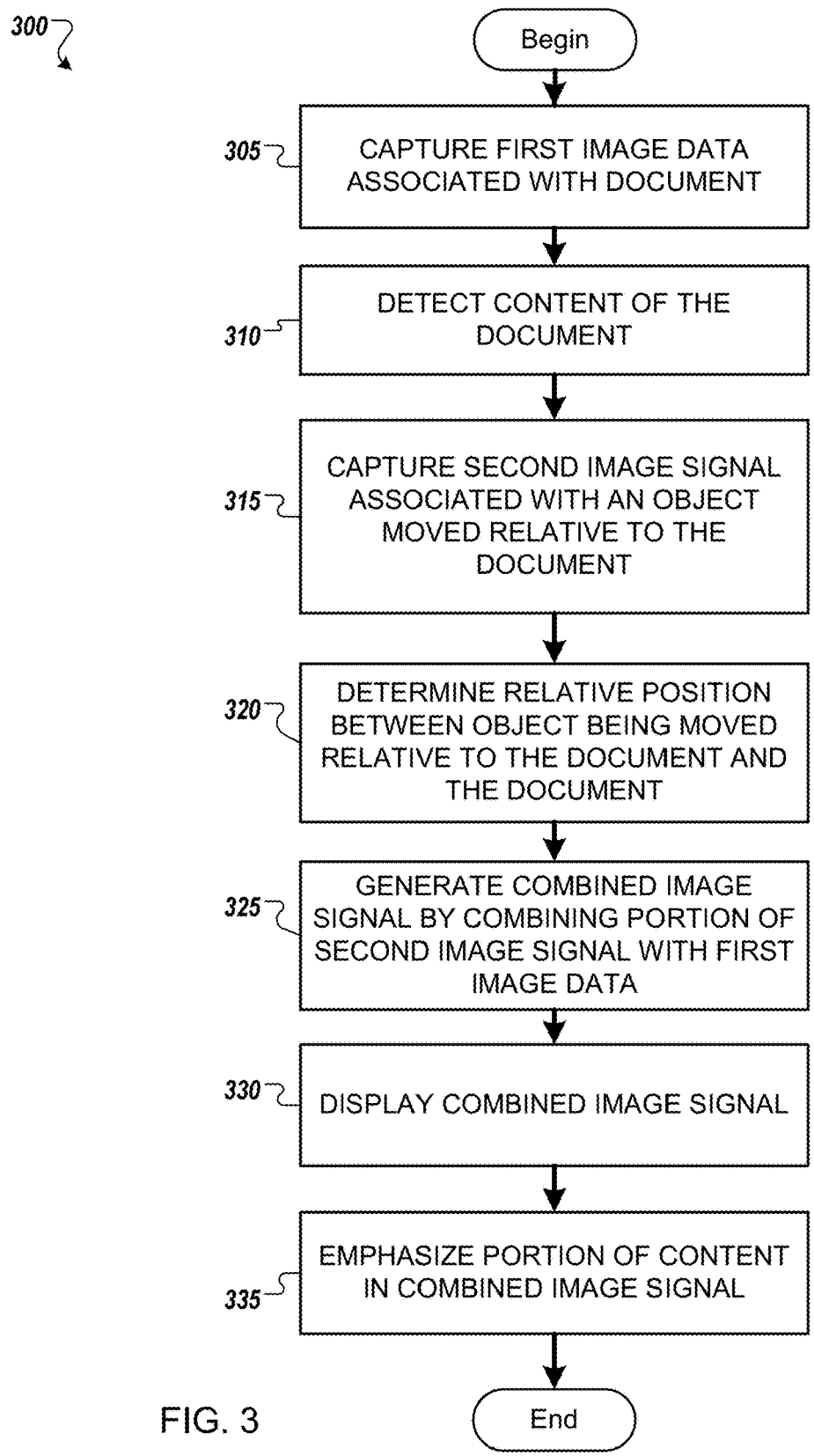
FIG. 3 illustrates a flowchart of a process for sharing a document according to an example implementation of the present application.

FIG. 3 illustrates a flowchart of a process 300 for sharing a document according to an example implementation of the present application. In some example implementations, all or parts of the process 300 may be performed by a document sharing apparatus (e.g., apparatus 105 of FIG. 1, apparatus 205 of FIG. 2) within a remote synchronous meeting system (e.g., remote synchronous meeting system 100 of FIG. 1, remote synchronous meeting system 200 of FIG. 2). In other example implementations, all or parts of the process 300 may be performed by other computing devices (e.g. devices 140-170 of FIG. 1, devices 240-270 of FIG. 2) in communication with a document sharing apparatus. The process 300 may also be performed by any other apparatus that may be apparent to a person of ordinary skill in the art.

In the process 300, first image data associated with a document is captured at 305. In some example implementations, the first image data may be captured by an imaging device such as a web camera, depth camera, video camera, digital image camera, or any other imaging device that may be apparent to a person of ordinary skill in the art.

However, example implementations are not limited to this configuration and in other example implementations, the first image data may be captured without using an imaging device. For example, the first image data associated with the document may be digitally extracted from a data file stored on a computing device (e.g., a smart phone, a tablet, a laptop, or any other computing device) connected to the document sharing apparatus. The first image data associated with the document may also be captured using any other mechanism that may be apparent to a person of ordinary skill in the art.

Once the first image data has been captured, the document content may be detected from the first image data in 310. The document content may be detected by applying to the captured first image data one or more of object recognition, character recognition, pattern recognition, or any other image recognition technique that may be apparent to a person of ordinary skill in the art. In some example implementations, the document content detection may include identifying words, phrases, or image content from the image data (e.g., the word, phrase, or image content may be identified by applying recognition techniques to the image data).

In other example implementations, the document content detection may include recognizing formatting (e.g., lines, paragraphs, columns, or any other document structures). For example, the document may be binarized, connected components extracted, grouped into words or lines, and segmented into regions using XY-cutting algorithms. The result of this content detection may include a set of words, lines, paragraphs, tables and figures areas.

At 315, second image data associated with an object positioned or moving relative to the document is captured. The second image data may be captured by an imaging device such as a web camera, depth camera, video camera, digital image camera, or any other imaging device that may be apparent to a person of ordinary skill in the art. In some example, implementations, the object may be a hand or limb of a presenter and the second image data may include detection of a gesture of the hand or limb. For example, a detected gesture may be a "thumbs-up" gesture, an "ok" gesture, a "thumbs-down" gesture, or any other gesture that may be apparent to a person of ordinary skill in the art.

In some example implementations, during the capturing of the second image data, the relative position between the document and the object being moved relative to the document is determined at 320. In other example implementations, the relative position between the document and the object may be determined before or after the second image data is captured.

The relative position between the document and the object may be determined using image data and depth data captured with a depth camera. Alternatively, the relative position between the document and the object may be determined using a capacitive sensor or other sensor configured to map the position of an object in three dimensions that may be apparent to a person of ordinary skill in the art.

Once the relative position between the document and the object is determined, the first image data and the second image data may be combined based on the determined relative position between the object and the document to generate a combined image signal at 325. In some example implementations, second image data may be added or overlaid on top of the first image data in regions where the relative position between the object and the document indicates that the object is close to the document (e.g., the relative distance between the object and the document is small). In such example implementations, the image values associated with the second image data may be reduced as a function of a relative distance between the object and the document (e.g., as the object moves away from the document the image values of the second image data reduce to zero). Algorithms for combining the first image data and the second image data are discussed in greater detail below with respect to FIG. 4. Example implementations of the combined image signal are illustrated with respect to FIGS. 5A-6B below.

Once the combined image signal is generated, the combined image signal may be displayed to a user in 330. In some example implementations, the combined image signal may be displayed on a computing device remotely located from the image capture device. For example, the image capture device may be associated with a document sharing apparatus (e.g., Apparatus 105 of FIG. 1, Apparatus 205 of FIG. 2), which may transmit the combined image signal to another device (e.g. devices 140-170 of FIG. 1, devices 240-270 of FIG. 2) via network (e.g., a wired or wireless network). In other example implementations, the combined image signal may be displayed to a user on a computing device directly connected to the image capture device.

In some example implementations, the combined image signal may be generated before transmission to the display device. Such example implementations may allow reduced processing power requirements by the display device. In other example implementations, the first image data, second image data, and relative position between the object and document may be transmitted to the display device separately and the combined image signal generated by the display device. Such example implementations may reduce transmission bandwidth requirements.

During display of the combined image signal, portions of the detected content may be emphasized based on the determined relative position between the object and the document. For example, portions of the content near the object (e.g., content having a low relative distance to the object) may be highlighted or an icon may be placed on portions of the content near the object. In some example implementations, emphasis may also include placement of an icon based the determined relative position and a gesture detected with the second image data. Other mechanisms of emphasizing portions of the document content based on the determined relative position between the object and the document may be apparent to a person of ordinary skill in the art. Example implementations of emphasizing portions of the detected content based on the determined relative position between the object and the document are illustrated in FIGS. 7A-9B below. After portions of the detected content have been emphasized, the process 300 may end.

Figure 4:
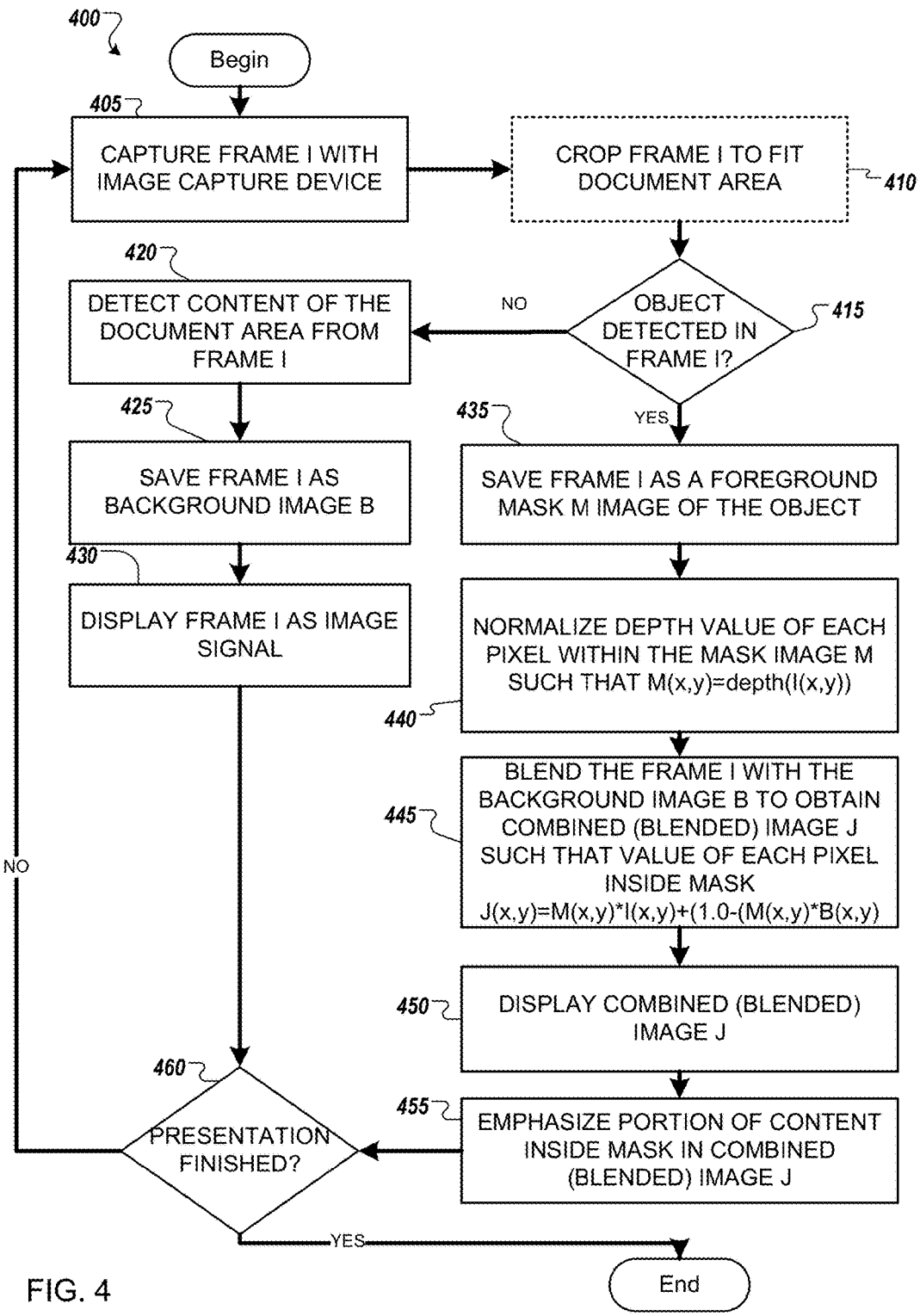
FIG. 4 illustrates a flowchart of an algorithm for sharing a document during a process according to an example implementation of the present application.

FIG. 4 illustrates a flowchart of an algorithm 400 for sharing a document during a process (e.g., process 300 of FIG. 3) according to an example implementation of the present application. In some example implementations, all or parts of the algorithm 400 may be performed by a document sharing apparatus (e.g., Apparatus 105 of FIG. 1, Apparatus 205 of FIG. 2) within a remote synchronous meeting system (e.g., remote synchronous meeting system 100 of FIG. 1, remote synchronous meeting system 200 of FIG. 2). In other example implementations, all or parts of the algorithm 400 may be performed by other computing devices (e.g. devices 140-170 of FIG. 1, devices 240-270 of FIG. 2) in communication with a document sharing apparatus.

In the example implementation of FIG. 4, an image capture device (e.g., a depth camera, web camera, video camera, or other image capture device) is used to capture both the first image data and the second image data and as discussed below captured frames from the image capture device are classified as either background images (e.g., first image data) or mask images (e.g., second image data). The background images and mask images can then be combined to produce the combined image signal as discussed below. Example implementations of the present application are not limited to this algorithm 400 and alternative algorithms may be apparent to a person of ordinary skill in the art.

As illustrated, a new frame I (e.g., a color and depth image) may be captured by an image capture device at 405. In some example implementations, the image capture device may be a depth camera (e.g., an RGB-D camera). Other example implementations may use other types of image capture devices that may be apparent to a person of ordinary skill in the art.

Once the frame I has been captured, the frame I may optionally be automatically cropped at 410 to remove any area surrounding the document area before further processing of the frame I. The automatic cropping may performed using document edge detection techniques or any other automatic cropping techniques that may be apparent to a person of ordinary skill in the art.

To determine whether the frame I is a background frame (e.g., first image data) or a masking frame (e.g., second image data), the frame I may be analyzed to determine if the object (e.g., a presenter's hand or limb, a pen, a pointer, or any other pointing object that may be apparent to a person of ordinary skill in the art) is present at 415. In some example implementations, the detection of the object may be performed using existing functions or algorithms provided by the image capture device (e.g., the depth camera or other image capture device).

If no object is detected (e.g., NO at 415), the content of the document area is detected at 420. In some example implementations, the content of the document area may be detected by applying one or more of object recognition, character recognition, pattern recognition, or any other image recognition technique that may be apparent to a person of ordinary skill in the art to the frame I. The document content detection may include identifying words, phrases, or image content from the frame I in some example implementations (e.g., the word, phrase, or image content may be identified by applying recognition techniques to the frame I).

In other example implementations, the document content detection may include recognizing formatting (e.g., lines, paragraphs, columns, or any other document structures) with the document. For example, the document may be binarized, connected components extracted, grouped into word lines, and segmented into regions using XY-cutting algorithms. The result of this detection may include a set of words, lines, paragraphs, tables and figures areas.

Once the content of the document area has been detected, the frame I may be saved as a background image frame B at 425. The background image frame B will be used to generate the combined image signal as discussed in greater detail below.

The frame I may be displayed to a user at 430. In some example implementations, the frame I may be displayed to a remote user on a computing device remotely located from the image capture device. For example, the image capture device may be associated with a document sharing apparatus (e.g., Apparatus 105 of FIG. 1, Apparatus 205 of FIG. 2), which may transmit the combined image signal to another device (e.g. devices 140-170 of FIG. 1, devices 240-270 of FIG. 2) via a network (e.g., a wired or wireless network). In other example implementations, the frame I may be displayed to a user on a computing device directly connected to the image capture device. After the frame I has been displayed to the user, a determination is made whether the presentation has ended. If the presentation has ended (YES—460), the algorithm 400 ends. If the presentation has not ended (NO—460), the algorithm 400 returns to 405 and a new frame I is captured.

Returning to 415 of the algorithm 400, if an object is detected in frame I (YES—415), the Frame I is saved as a foreground mask image M (e.g., the second image data) of the object at 435.

After Frame I is saved as the foreground mask image M, the depth values of the Frame I for the pixels (x, y) are normalized so that the pixels are within a range [0.0, 1.0] at 440. This range may correspond to a range of physical world coordinates that is bounded by the location of the image capture device and the document. For the blending of the background image B and the frame I discussed below, only the pixels inside the mask image M may be needed in some example implementations. The pixels within the mask image M can be set to the depth values:

$$M(x, y) = \text{depth}(I(x, y)) \qquad (1)$$

After the pixels within the mask image M have been normalized, the background image B and the frame I can be blended to produce a combined or blended image J (e.g., a combined image signal) at 445. The blending of the frame image I with the background image B to obtain blended image J within the mask image may be performed by setting the value of each pixel inside the mask M to be:

$$J(x, y) = M(x, y) * I(x, y) + (1.0 - M(x, y)) * B(x, y) \qquad (2)$$

Values of the pixels of the blended image J that are not within the mask image M may be set to the values of the background image B such that:

$$J(x, y) = B(x, y) \qquad (3)$$

Example implementations of combining or blending the frame I and the background image B are illustrated with respect to FIGS. 5A-6B below.

After the combined or blended image J is generated, the combined image J may be displayed to a user. In some example implementations, the combined image J may be displayed to a remote user on a computing device remotely located from the image capture device. For example, the image capture device may be associated with a document sharing apparatus (e.g., Apparatus 105 of FIG. 1, Apparatus 205 of FIG. 2), which may transmit the combined image signal to another device (e.g. devices 140-170 of FIG. 1, devices 240-270 of FIG. 2) via network (e.g., a wired or wireless network). In other example implementations, the combined image J may be displayed to a user on a computing device directly connected to the image capture device.

In some example implementations, the resulting blended image J can be sent to the computing device to be displayed to the user. In other example implementations, Frame I, background image B, and mask image M may be sent to the computing device separately. The computing device may perform the image blending prior to displaying the blended image to the user. This example implementation may allow sending a high resolution of the document (i.e. the background image B) at a lower frame rate, while the moving object (i.e. foreground mask image M) can be sent at a lower resolution at a higher frame rate based on transmission bandwidth.

During display of the combined image J, portions of the detected content area may be emphasized based on the depth values of the mask image M of the object. For example, portions of the content near the object (e.g., content have a low relative distance to the object) may be highlighted or an icon may be placed on portions of the content near the object. In some example implementations, emphasis may also include placement of an icon based on the determined relative position and a gesture detected in the mask image. Other mechanisms of emphasizing portions of the document content based on the determined relative position between the object and the document may be apparent to a person of ordinary skill in the art. Example implementations of emphasizing portions of the detected content based on the determined relative position between the object and the document are illustrated in FIGS. 7A-9B below.

After the combined image J has been displayed to the user and portions of the detected content have been emphasized, a determination is made whether the presentation has ended. If the presentation has ended (YES—460), the algorithm 400 ends. If the presentation has not ended (NO—460), the algorithm 400 returns to 405 and a new Frame I is captured.

Figure 5A:
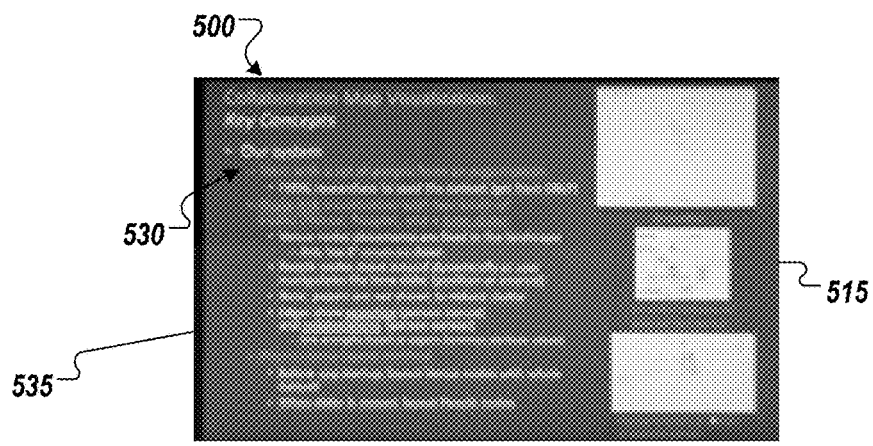
FIGS. 5A-5C illustrate screen captures of document sharing according to an example implementation of the present application.
Figure 5B:
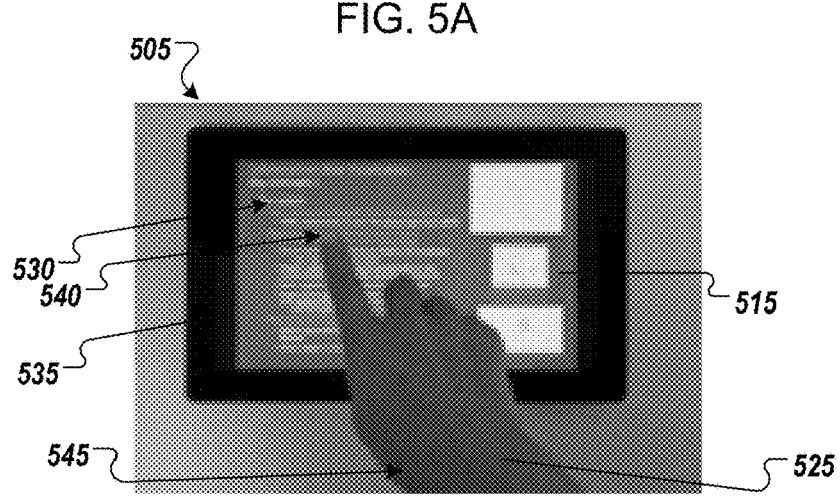
Figure 5C:
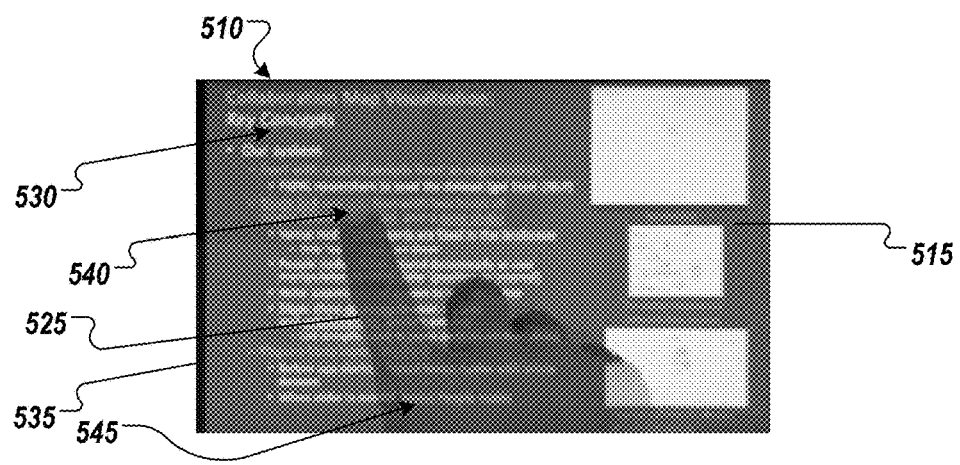

FIGS. 5A-5C illustrate screen captures 500-510 of document sharing according to an example implementation of the present application. FIG. 5A illustrates an example of a background image 500 (e.g., first image data) of the document 515 captured by an image capture device. The background image 500 has been cropped to remove the area outside of the area of the document content 530. As illustrated, the document 515 is an electronic document displayed on a computing device 535 (e.g., a tablet, smart phone, or other computing device that may be apparent to a person of ordinary skill in the art).

FIG. 5B illustrates an example of a frame image 505 (e.g. frame I) used to generate a mask image M (e.g., second image data) of the object 525. Within the frame image 505, the document 515 is displayed on the computing device 535 behind the object 525. The frame image 505 may be used to determine the relative horizontal and vertical positions (e.g., position within the image) between the object 525 and the document 515.

In example implementations in which the document content 530 has been detected as discussed above, the relative horizontal and vertical positions (e.g., position within the image) between the object 525 and the document content 530 can also be determined. If the frame image 505 is captured with a depth camera, the frame image 505 can also include depth information that can be used to determine relative depth (e.g., distance between the object 525 and the image capture device or the document 515). Depth information of the object 525 may also be detected using a depth or distance sensor (e.g., sensor unit 275 of FIG. 2) in some example implementations.

FIG. 5C illustrates an example of a combined or blended image 510 (e.g., blended image J) to be displayed to a user. As illustrated, the background image 500 of the document 515 has been used to render the document content 530 in regions where the object 525 is not detected. Further, the frame image 505 has been used to make a mask image of the object 525 that has been overlaid onto the background image 500. In FIGS. 5B and 5C, the region 540 of the object 525 is closer to the document 515 then the region 545 of the object 525 (e.g., the region 540 of the object 525 is closer to the image capture device than the region 545). Based on the depth information, the mask image of the object 525 has been rendered more translucent in regions of the blended image 510 where the object is further from the document 515 (e.g., closer to the image capture device). As illustrated, the region 545 of the object 525 rendered more translucently than the region 540 of the object 525 in FIG. 5C.

Figure 6A:
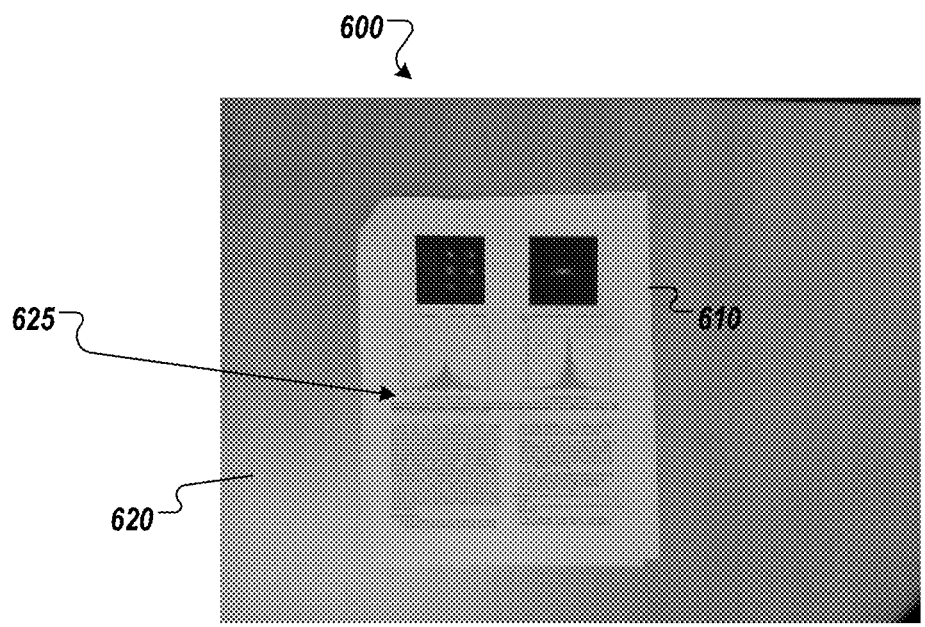
FIGS. 6A-6E illustrate screen captures of document sharing according to another example implementation of the present application.

FIGS. 6A-6E illustrate screen captures 600, 605-608 of document sharing according to another example implementation of the present application. FIG. 6A illustrates an example of a background image 600 (e.g., first image data) of the document 610 captured by an image capture device. As illustrated, the document 610 is printed on paper and placed on a surface 620 below the image capture device. In some example implementations, the document content 625 may be detected from the document 610 using recognition techniques as discussed above.

Figure 6B:
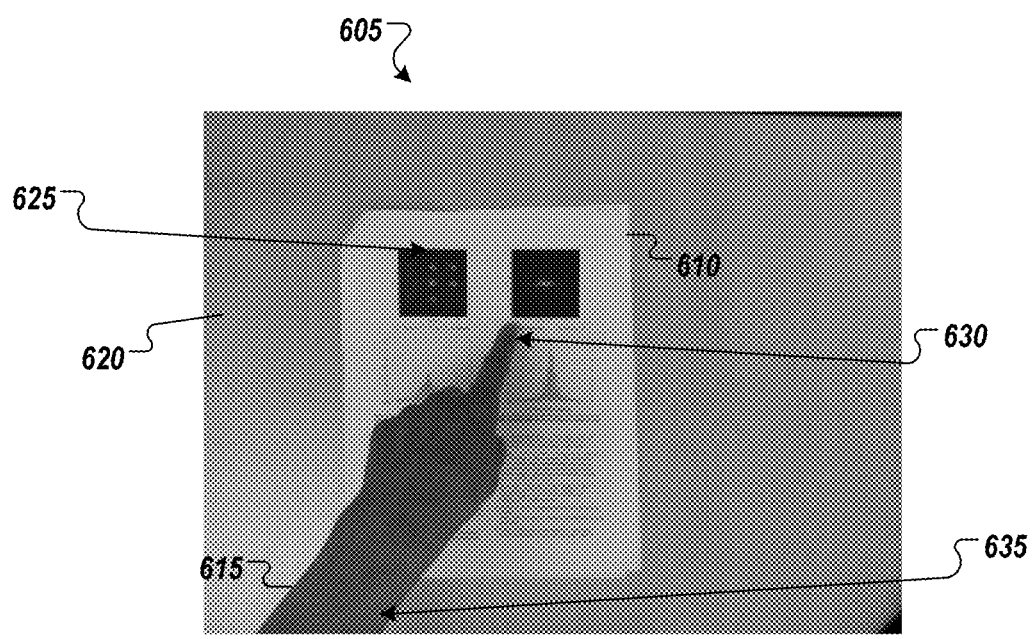

FIG. 6B illustrates an example of a frame image 605 (e.g. frame I) used to generate a mask image 607 (illustrated in FIG. 6D discussed below) of the object 615. The frame image 600 may be used to determine the relative horizontal and vertical position (e.g., position within the image) between the object 615 and the document 610. In example implementations in which the document content 625 has been detected as discussed above, the relative horizontal and vertical position (e.g., position within the image) between the object 615 and the document content 625 can also be determined.

In FIG. 6B (and FIGS. 6C-6E discussed below), the region 630 of the object 615 is closer to the document 610 then the region 635 of the object 615 (e.g., the region 635 of the object 615 is closer to the image capture device than the region 630). If the frame image 605 is captured with a depth camera, the frame image 605 can also include depth information 606 (illustrated in FIG. 6C) that can be used to determine relative depth (e.g., distance between the object 615 and the image capture device or the document 610). Depth information 606 of the object 615 may also be detected using a depth or distance sensor (e.g., sensor unit 275 of FIG. 2) in some example implementations.

Figure 6C:
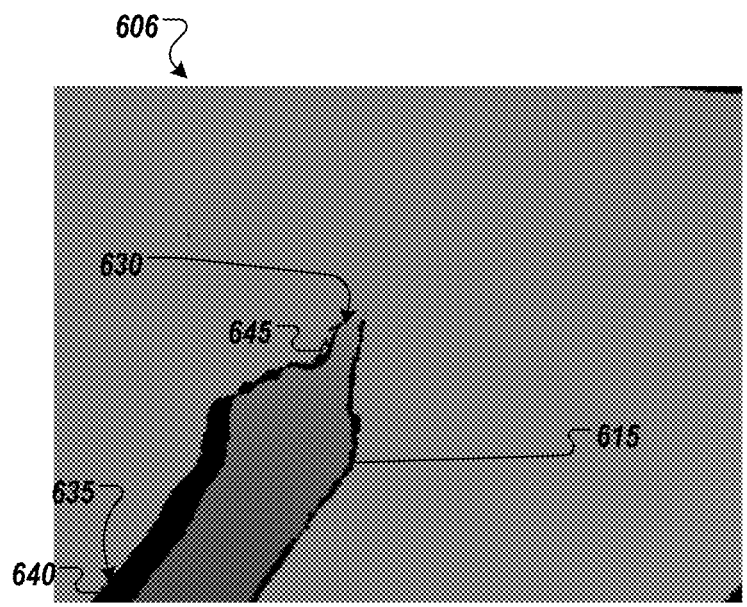

FIG. 6C illustrates an example of depth information 606 extracted from the frame image 605 (e.g. frame I). This depth image 606 is a grayscale image with darker gray values for points closer to the depth camera device (the completely black areas are noisy areas that can be ignored when the image is processed). As mentioned above, the region 630 of the object 615 is closer to the document 610 then the region 635 of the object 615 (e.g., the region 635 of the object 615 is closer to the image capture device than the region 630). Thus, the region 630 of the object 615 has relatively lighter gray values in area 640 and the region 635 of the object 615 has relatively darker gray values in area 645. This depth information 606 may be used to combine or blend the mask image 607 of FIG. 6D with the frame image 605 of FIG. 6B to generate the blended image 608 of FIG. 6E.

Figure 6D:
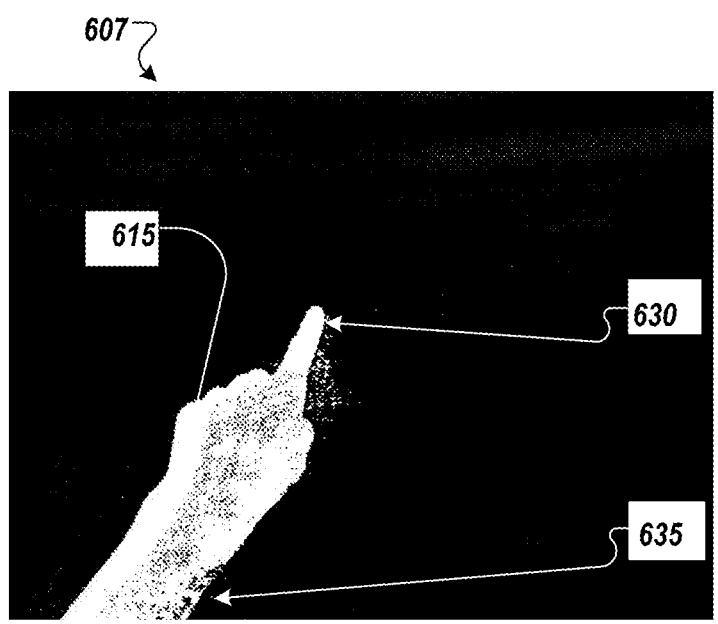

FIG. 6D illustrates the mask image 607 of the object 615 extracted from the frame image 605 (e.g. frame I). Again, the region 630 of the object 615 is closer to the document 610 then the region 635 of the object 615 (e.g., the region 635 of the object 615 is closer to the image capture device than the region 630). The mask image 607 illustrates the object 615 with all other background information removed.

Figure 6E:
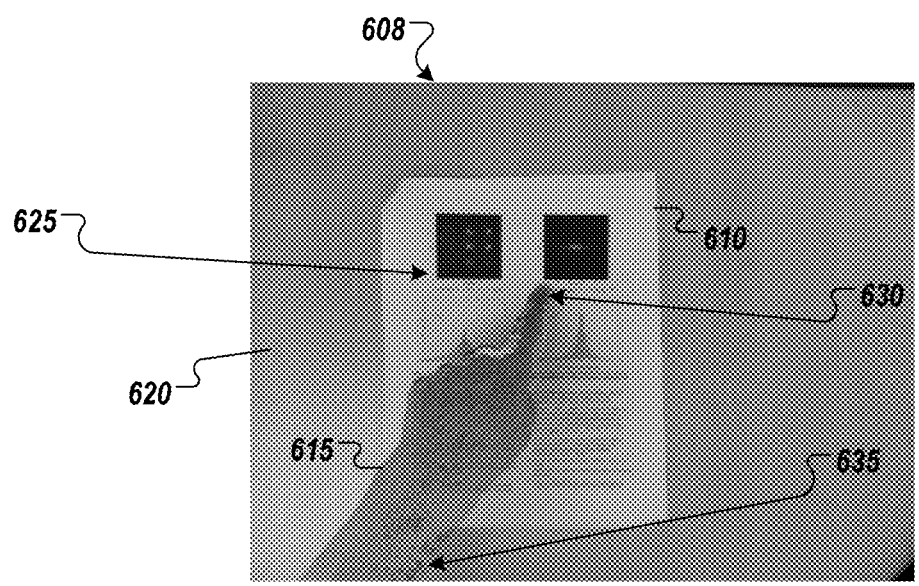

FIG. 6E illustrates an example of a combined or blended image 608 (e.g., blended image J) to be displayed to a user. As illustrated, the background image 600 (illustrated in FIG. 6A) of the document 610 has been used to render the regions of document content 625 where the object 615 is not detected. Further, the frame image 605 has been used to make a mask image 607 (illustrated in FIG. 6D) of the object 615 that has been overlaid onto the background image 600. Based on the depth information 606 (illustrated in FIG. 6C), the pixels of the frame image (e.g. frame I) inside the mask image 607 (illustrated in FIG. 6D) that make up the object 615 has been rendered more translucent in regions of the blended image 608, where the object is further from the document 610 (e.g., closer to the image capture device). As illustrated, the region 635 of the object 615 rendered more translucently than the region 630 of the object 615 in FIG. 6E.

Figure 7A:
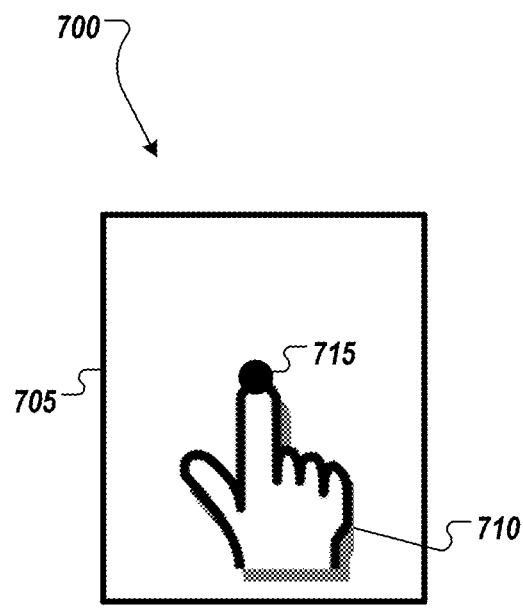
FIGS. 7A and 7B illustrate example implementations of displaying an icon on document content according to the present application.
Figure 7B:
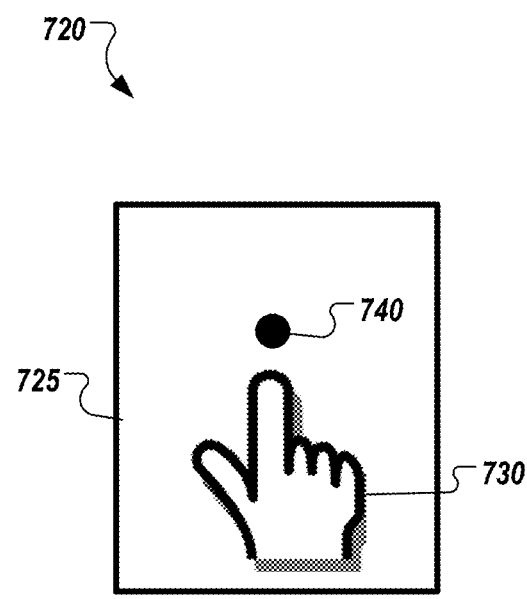

FIGS. 7A and 7B illustrate example implementations of displaying an icon on document content according to the present application. FIG. 7A illustrates a first implementation 700 where an icon 715 is placed onto the document 705 at a point nearest the object 710. The icon 715 is not particularly limited and may include a dot, a box, an arrow, or any other icon that may be apparent to a person of ordinary skill in the art.

In some example implementations, the icon 715 may be placed based only on the relative horizontal position (e.g., position within the image) between the object 710 and the document 705.

For example, object recognition algorithms may be used to determine which direction the object 710 is pointing and the icon 715 may be placed on the document 705 at the closest point to where the object 710 is pointing. As the icon 715 can placed based only on the relative horizontal position (e.g., position within the image), the relative depth position information from a depth camera or a sensor may not be required. Thus, placement of the icon 715 may be simplified.

FIG. 7B illustrates a second implementation 720 where the icon 740 is placed onto the document 725 at a point extrapolated based on the orientation and position of the object 730. Again, the icon 740 is not particularly limited and may include a dot, a box, an arrow, or any other icon that may be apparent to a person of ordinary skill in the art.

In some example implementations, the icon 740 may be placed based on both the relative horizontal position (e.g., position within the image) between the object 730 and the document 725 and the vertical position (e.g., depth or distance from the image capture device or the document 725). As discussed below with respect to FIG. 8A and 8B, an orientation of the object 730 may be determined based on the detected relative horizontal and vertical positions of the object 730. Based on the detected orientation, a point on the document 725 at which the object 730 is pointing may be extracted and the icon 740 can be placed at the extracted point.

Figure 8A:
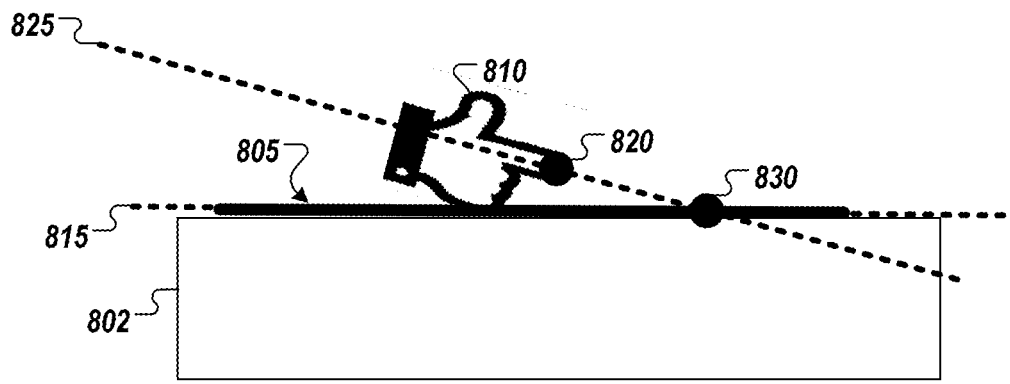
FIGS. 8A and 8B illustrate extraction of a region on a document to which an object may be pointing according to an example implementation of the present application.
Figure 8B:
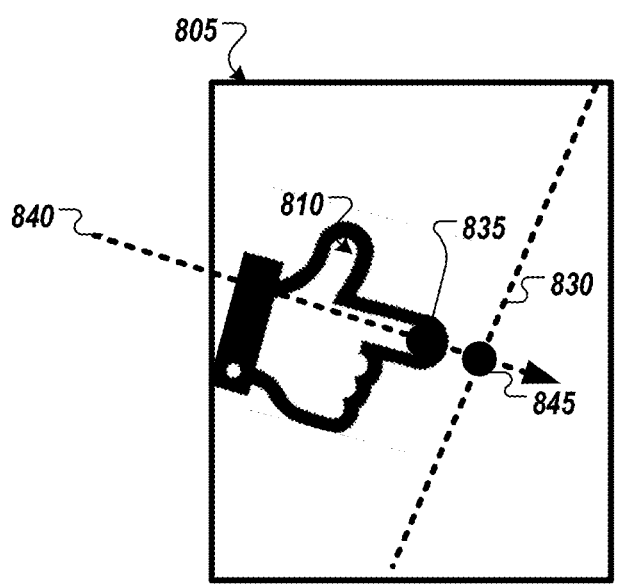

FIGS. 8A and 8B illustrate extraction of a region 845 on a document 805 to which an object 810 may be pointing according to an example implementation of the present application. FIG. 8A represents a side view showing the document 805 placed on a support surface 802 with the object 810 located above the document 805. FIG. 8B represents a top view of showing the object 810 located above the document 805. In example implementations, the depth information may be used to create a 3D geometric model of the space above the support surface 802 to extrapolate a line along the object and calculating the intersection of that line and the document plane to determine a placement for a cursor or icon in a blended image.

For example, a lowest point 820 of the object 810 (e.g., the point of the object 810 closest to the document 805) may be identified based on depth information from a depth camera or other depth sensor. Based on the identified lowest point 820 of the object, a plane 825 of orientation the object 810 passing through the lowest point 820 may be identified using object tracking algorithms. Once the plane 825 of orientation of the object is identified, an intersection line 830 between the identified plane 825 and the plane 815 of the document 805 may be determined.

The intersection line 830 may be used to identify a point 835 on the object 810 closest to the intersection line 830 in the top view (e.g., a view from the image capture device). Based on the identified point 835 on the object 810, a pointing direction vector 840 of the object 810 may be determined using mapping and object recognition algorithms. The intersection point between the pointing direction vector 840 and the intersection line 830 may identify region 845 on the document 805 and be used for placement of a cursor or icon as discussed in FIG. 7B above.

Using object position tracking as described above, example implementations may map object (e.g., hand, finger, or limb) motion to specific actions such as highlighting, zooming, blurring out/focusing, adding marginalia, etc. For example, mapping object (e.g., hand, finger, or limb) motion may allow the user to interact with semantically meaning parts of the content (e.g. words and text lines). These parts of the content may be available based on encoding of an electronic version of the document (e.g., a document file) stored on a storage device. Alternatively, these parts of the content may be determined by leveraging document content analysis algorithms. Further, layout analysis may be performed on the document to identify words or text lines, columns, image areas and bounding boxes thereof.

Further, by determining where an object is pointing (e.g., using 3D modelling as discussed above with respect to FIGS. 8A and 8B), and rendering a highlight (e.g. using a box) on the word or line being pointed to may allow different interactions with content based on what is pointed at. For example, FIGS. 9A and 9B illustrate different interactions with the document content based on example implementations of the present application.

Figure 9A:
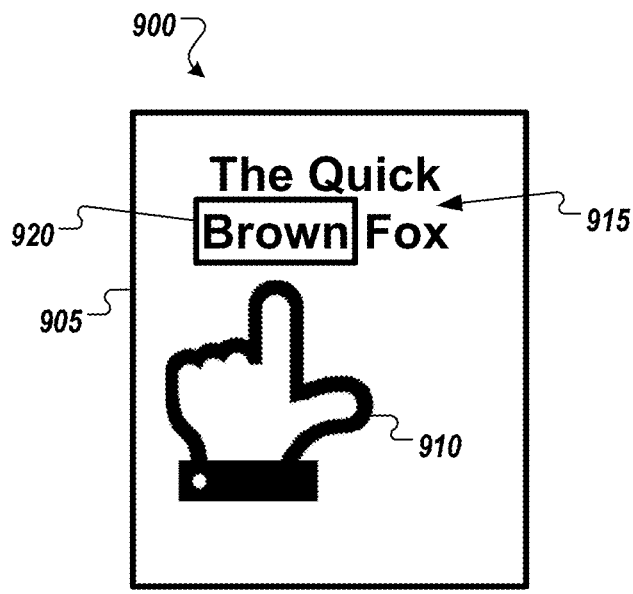
FIGS. 9A and 9B illustrate interaction with the document content based on example implementations of the present application.

FIG. 9A illustrates a schematic illustration of a displayed image 900 of a first interaction with document content 915. As illustrated, an object 910 (e.g., a hand, limb, finger, or other pointing object) is illustrated over the document 905 near a portion (e.g., a word) of the content 915. Based on detection of the object 910 near the portion (e.g., a word) of the content 915, a box 920 is added to the displayed image 900 highlighting the portion of the content (e.g., a word) of the content 915.

Figure 9B:
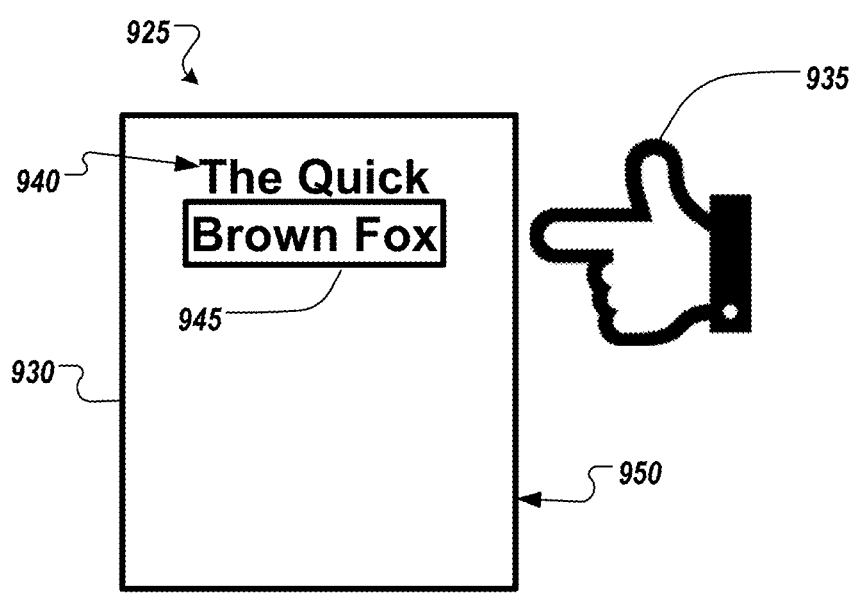

FIG. 9B illustrates a schematic illustration of a displayed image 925 of a second interaction with document content 940. As illustrated, an object 935 (e.g., a hand, limb, finger, or other pointing object) is illustrated near an edge 950 of the document 930 near a larger portion (e.g., a line) of the content 940. Based on detection of the object 935 near the edge 950 of the document 930 near the larger portion (e.g., a line) of the content 940, a box 945 is added to the displayed image 925 highlighting the larger portion of the content (e.g., a line) of the content 940. Other example implementations of interaction with document content 940 are discussed below.

In some example implementations, the object detected over the document may be a user's hand or limb, and the user's hand or limb position over regions of the document content may trigger overlays or zoom-ins on the document. For example:

Highlighting text: when the user moves the finger or limb horizontally while pointing at a text line, a transient highlight over the text could be created to help the remote user with understanding the area of interest;

Zooming into a region: when the user taps several times over a part of the document, a zoom into the part of the document could be performed;

Focusing on a region/blurring the rest: when the user moves a finger or limb vertically next to a paragraph region, a marginalia could be created and, optionally, the rest of the document page could be blurred and/or the selected paragraph shown at a higher resolution;

Cropping: the user could use both hands or limbs to "crop" a region;

Highlighting a column: when the user moves a finger vertically over a table column, the whole column could be highlighted.

Further, a presenter may sometimes perform a gesture while pointing at a part of a document (e.g., a thumbs up ("good"), thumbs down ("bad"), waving his or her hands ("not sure about that"), hands placed palm open ("what's this?")). In some example implementations, these gestures may be recognized by an image capture device, and a representation of the gesture may be displayed on the document next to where the presenter is pointing. This may allow a remote participant to see both the full details of the document area as well as the gesture that accompanies presentation. For example, recognized gestures can be shown as is, or the gesture may be replaced by a more abstract graphical representation (e.g., thumbs up icon, question mark icon, etc.). In some example implementations, the shared or presented documents may be captured for archiving purposed. For example, a presenter may discuss and share a document with another user who cannot attend a teleconference in real time and the shared document may be captured and stored for later review by the other user. When a user replays the archived document sharing, the important gestures that were performed during the earlier presentation can be observed by the reviewing user. Thus, gesture triggered annotations can be captured and placed on the page where the author intended.

Evaluation

An evaluation prototype has been built using an Intel F200 RGB-D camera. For evaluation, color and depth images were be captured at 60 fps (frames per second), and the image processing (i.e. background separation, alpha blending) was slowed down to about 45 fps. This was found to have more favorable results compared to standard video captured at 30 fps. A separate module was developed to evaluate transmitting the blended image to a remote client. The frame images were sent uncompressed over a LAN, and could achieve transfer rates of 120 fps for sending the image data, and 50 fps if the images are also displayed in a window on the receiving device.

Example Environment

Figure 10:
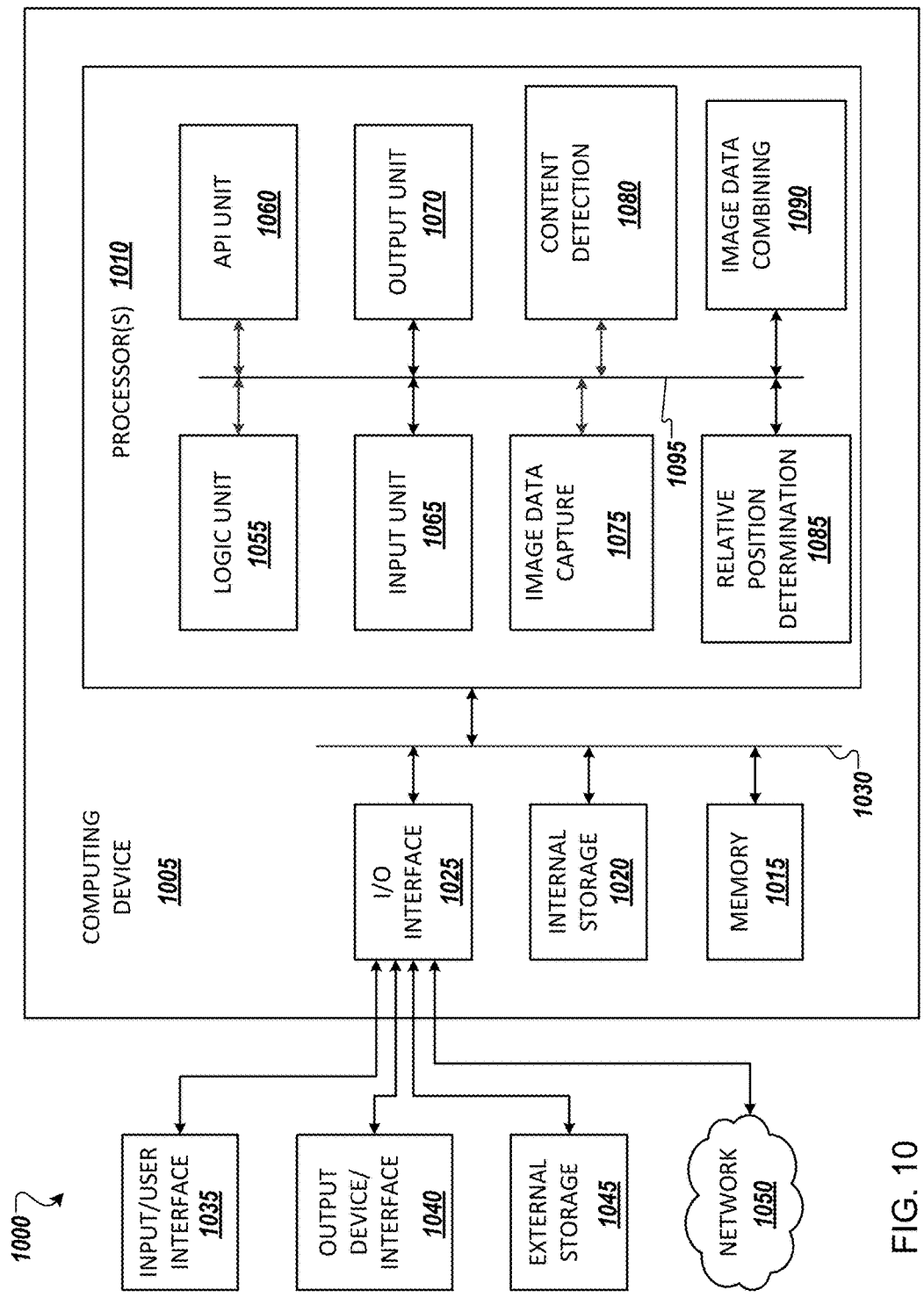
FIG. 10 illustrates an example computing environment with an example computer device suitable for use in some example implementations.

FIG. 10 illustrates an example computing environment 1000 that could be used for remote synchronous meeting with an example computing device 1005 suitable for use in some example implementations. Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1055, application programming interface (API) unit 1060, input unit 1065, output unit 1070, image data capture unit 1075, content detection unit 1080, relative position determination unit 1085, image data combining unit 1090, and inter-unit communication mechanism 1095 for the different units to communicate with each other, with the OS, and with other applications (not shown). For example, image data capture unit 1075, content detection unit 1080, relative position determination unit 1085, and image data combining unit 1090 may implement one or more processes shown in FIGS. 3-4. The described units and elements can be varied in design, function, configuration, or implementation and are not limited to the descriptions provided.

In some example implementations, when information or an execution instruction is received by API unit 1060, it may be communicated to one or more other units (e.g., logic unit 1055, input unit 1065, output unit 1070, image data capture unit 1075, content detection unit 1080, relative position determination unit 1085, and image data combining unit 1090). For example, when the image data capture unit 1075 captures image data of a document, the image data can be sent to the content detection unit 1080 to detect the content of the document. Additionally, the relative position determination unit 1085 may determine the position of the object relative to the document and provide relative position information to the image data combining unit 1090. Further, the image data combining unit 1090 may generate the combined image data based on first and second image data captured by the image data capture unit 1075 and the relative position determination unit 1085.

In some instances, the logic unit 1055 may be configured to control the information flow among the units and direct the services provided by API unit 1060, input unit 1065, output unit 1070, image data capture unit 1075, content detection unit 1080, relative position determination unit 1085, and image data combining unit 1090 in some example implementations described above. For example, the flow of one or more processes or implementations may be controlled by logic unit 1055 alone or in conjunction with API unit 1060.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

We claim:

1. A method of sharing documents comprising:
capturing first image data associated with a document;
detecting content of the document based on the captured first image data using image recognition to extract features of the content;
capturing second image data associated with an object controlled by a user moved relative to the document;
determining a relative position between the document and the object;
combining a portion of the second image data with the first image data based on the determined relative position to generate a combined image signal that is displayed; and
emphasizing a portion of the extracted features of the content in the displayed combined image signal by modifying the first image data in the combined image signal, based on the relative position and the extracted features of the content,
wherein the determining a relative position between the document and the object comprises:
detecting a distance from the document; and
detecting a horizontal position parallel relative to a surface of the document; and
wherein the emphasizing a portion of the extracted features comprises:
extrapolating a pointing direction of the object based on a detected shape of the object, the detected distance from the document and the detected horizontal position.

2. The method of claim 1, wherein the emphasizing the portion of the extracted features of the content comprises generating an icon representative of the object based on the second image data and modifying the first image data to overlay the icon onto the emphasized portion of the extracted features of the content in the generated combined image signal.

3. The method of claim 1, wherein the emphasizing the portion of the extracted features of the content comprises modifying the first image data to highlight the portion of the extracted features of the content based on the determined relative position between the object and the document.

4. The method of claim 1, wherein the object is a limb of the user; and
wherein the capturing the second image data comprises detecting a gesture of the limb; and
wherein the emphasizing the portion of the extracted features of the content comprises modifying the first image data to perform an action associated with the detected gesture.

5. The method of claim 4, wherein the modifying the first image data to perform the action associated with the detected gesture includes one or more of: highlighting the emphasized portion of the extracted features of the content of the document; enlarging the emphasized portion of the extracted features of the content; focusing on the emphasized portion of the extracted features of the content; blurring the emphasized portion of the extracted features of the content; and cropping the emphasized portion of the extracted features of the content.

6. The method of claim 4, wherein the modifying the first image data to perform the action comprises generating an icon representative of the gesture and overlaying the icon on the document combined image data.

7. The method of claim 4, further comprising determining a relative position between the limb and the portion of the extracted features of the content; and wherein the performing an action associated with the detected gesture comprises:

modifying the first image data to perform a first action based on the limb being determined to be in a first relative position to the portion of the extracted features of the content; and modifying the first image data to perform second, different action based on the limb being determined to be in a second relative position to the portion of the extracted features of the content.

8. The method of claim 7, wherein the first action comprises highlighting the entire portion of the extracted features of the content based on the limb being determined to be in the first relative position to the portion of the extracted features of the content; and wherein the second action comprises highlighting less than the entire portion of the extracted features of the content based on the limb being determined to be in the second relative position to the portion of the extracted features of the content.

9. The method of claim 1, wherein the generated combined image signal is stored to an archive for later display.

10. A non-transitory computer readable medium having stored therein a program for making a computer execute a method of sharing documents, the method comprising:

capturing first image data associated with a document;

detecting content of the document based on the captured first image data using image recognition to extract features of the content;

capturing second image data associated with an object controlled by a user moved relative to the document;

determining a relative position between the document and the object;

combining a portion of the second image data with the first image data based on the determined relative position to generate a combined image signal that is displayed; and emphasizing a portion of the extracted features of the content in the displayed combined image signal by modifying the first image data in the combined image signal, based on the relative position and the extracted features of the content, wherein the determining a relative position between the document and the object comprises:

detecting a distance from the document; and detecting a horizontal position parallel relative to a surface of the document; and wherein the emphasizing a portion of the extracted features comprises:

extrapolating a pointing direction of the object based on a detected shape of the object, the detected distance from the document and the detected horizontal position.

11. The non-transitory computer readable medium of claim 10, wherein the emphasizing the portion of the content comprises modifying the first image data to highlight the emphasized portion of the extracted features of the content based on the determined relative position between the object and the document.

12. The non-transitory computer readable medium of claim 10, wherein the object is a limb of the user; and wherein the capturing the second image data comprises detecting a gesture of the limb; and wherein the emphasizing the portion of the extracted features of the content comprises modifying the first image data to perform an action associated with the detected gesture.

13. The non-transitory computer readable medium of claim 12, wherein the modifying the first image data to perform the action associated with the detected gesture includes one or more of: highlighting the emphasized portion of the extracted features of the content of the document; enlarging the emphasized portion of the extracted features of the content; focusing on the emphasized portion of the extracted features of the content; blurring the emphasized portion of the extracted features of the content; and cropping the emphasized portion of the extracted features of the content.

14. The non-transitory computer readable medium of claim 12, wherein the modifying the first image data to perform the action comprises generating an icon representative of the gesture and overlaying the icon on to the document.

15. The non-transitory computer readable medium of claim 12, further comprising determining a relative position between the limb and the portion of the extracted features of the content; and wherein the performing an action associated with the detected gesture comprises:

modifying the first image data to perform a first action based on the limb being determined to be in a first relative position to the portion of the extracted features of the content; and modifying the first image data to perform a second, different action based on the limb being determined to be in a second relative position to the portion of the extracted features of the content.

16. The non-transitory computer readable medium of claim 15, wherein the first action comprises highlighting the entire portion of the content based on the limb being determined to be in the first relative position to the portion of the extracted features of the content; and wherein the second action comprises highlighting less than the entire portion of the content based on the limb being determined to be in the second relative position to the portion of the extracted features of the content.

17. A document sharing apparatus configured to share a document, the apparatus comprising:

a memory;

an image capture device and a processor configured to:

capture first image data associated with a document;

detect content of the document based on the captured first image data using image recognition to extract features of the content;

capture second image data associated with an object controlled by a user moved relative to the document;

determine a relative position between the document and the object;

combine a portion of the second image data with the first image data based on the determined relative position to generate a combined image signal that is displayed; and emphasize a portion of the extracted features of the content in the displayed combined image signal by modifying the first image data in the combined image signal, based on the relative position and the extracted features of the content wherein the determining a relative position between the document and the object comprises:

detecting a distance from the document; and detecting a horizontal position parallel relative to a surface of the document; and wherein the emphasizing a portion of the extracted features comprises:
extrapolating a pointing direction of the object based on a detected shape of the object, the detected distance from the document and the detected horizontal position.

18. The document sharing apparatus of claim 17, wherein the processor is configured to emphasize the portion of the extracted features of the content by generating an icon representative of the object based on the second image data and modifying the first image data to overlay the icon onto the emphasized portion of the extracted features of the content in the generated combined image signal.

19. The document sharing apparatus of claim 17, wherein the object is a limb of a user; and
wherein the processor is configured to capture the second image data by detecting a gesture of the limb; and
wherein the processor is configured to emphasize the portion of the extracted features of the content modifying the first image data to perform an action associated with the detected gesture.

20. The document sharing apparatus of claim 19, wherein the processor is configured to further determine a relative position between the limb and the portion of the extracted features of the content; and
wherein the processor is configured to perform the action associated with the detected gesture by:
modifying the first image data to perform a first action based on the limb being determined to be in a first relative position to the portion of the extracted features of the content; and
modifying the first image data to perform a second, different action based on the limb being determined to be in a second relative position to the portion of the extracted features of the content.

* * * * *